(12) United States Patent
Savir et al.

(10) Patent No.: US 11,494,253 B2
(45) Date of Patent: Nov. 8, 2022

(54) DATA RECORD ANOMALY RECONCILIATION USING MACHINE LEARNING MODELS

(71) Applicant: EMC IP Holding Company LLC, Hopkinton, MA (US)

(72) Inventors: Amihai Savir, Sansana (IL); Noga Gershon, Dimona (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 373 days.

(21) Appl. No.: 16/587,367

(22) Filed: Sep. 30, 2019

(65) Prior Publication Data

US 2021/0096943 A1 Apr. 1, 2021

(51) Int. Cl.
| | |
|---|---|
| G06F 16/00 | (2019.01) |
| G06F 11/07 | (2006.01) |
| G06F 16/28 | (2019.01) |
| G06Q 30/06 | (2012.01) |
| G06N 20/00 | (2019.01) |

(52) U.S. Cl.
CPC ...... *G06F 11/0793* (2013.01); *G06F 11/0727* (2013.01); *G06F 16/285* (2019.01); *G06N 20/00* (2019.01); *G06Q 30/0635* (2013.01)

(58) Field of Classification Search
CPC ............. G06F 11/0709; G06F 11/0727; G06F 11/0793; G06F 16/215; G06F 16/285; G06F 16/90335; G06F 16/904; G06N 20/00; G06N 20/10; G06N 20/20; G06N 3/0445; G06N 3/0454; G06N 3/0472; G06N 3/084; G06N 3/088; G06N 5/003; G06N 5/02; G06N 5/048; G06N 7/005
See application file for complete search history.

(56) References Cited

U.S. PATENT DOCUMENTS

2020/0126037 A1* 4/2020 Tatituri ................. G06N 20/00
2021/0301655 A1* 9/2021 Ranganathan ......... G01V 11/00

OTHER PUBLICATIONS

"Price lists, estimates, quotations and tenders", downloaded on Sep. 25, 2019 from https://www.infoentrepreneurs.org/en/guides/price-lists-estimates-quotation-and-tenders/.
"Oracle Order Management Implementation Manual", downloaded on Sep. 25, 2019 from https://docs.oragle.com/cd/E18727_01/doc.121/e13406/T373258T374818.htm.

* cited by examiner

*Primary Examiner* — Yicun Wu
(74) *Attorney, Agent, or Firm* — Ryan, Mason & Lewis, LLP (57) ABSTRACT

Techniques are provided for data record anomaly reconciliation using machine learning models. One method comprises obtaining a data record comprising multiple line items; assigning the line items to a given cluster of similar line items to determine a line item neighborhood score for each line item based on a comparison of a given line item to other available line items in the assigned cluster; applying features of the data record to a machine learning model to determine a data record score for the data record based on a combination of the line item neighborhood scores for the data record; identifying anomalies in the data record based on the data record score and/or the line item neighborhood scores for the data record; and adjusting parameters of the line items to address the anomalies identified in the data record to produce a reconciled data record, based on the line item neighborhood scores and/or predefined adjustment rules.

20 Claims, 8 Drawing Sheets

| Data Record 300 (Order Quotation) | | | | |
|---|---|---|---|---|
| Line Item Identifier (Product Name) | Parameter A (Price) | Parameter B (Quantity) | ... | Parameter N (Price Below Floor Price?) |
| | | | | |
| | | ... | ... | |
| | | | | |

DATA RECORD ANOMALY RECONCILIATION USING MACHINE LEARNING MODELS

FIELD

The field relates generally to information processing, and more particularly to the processing of data records.

BACKGROUND

A number of applications process data records having multiple line items. In some situations, one or more anomalous line items may cause the entire data record to be rejected. For example, a price quotation having multiple line items may include one or more line items that violate one or more pricing rules, such as a particular line item being below a specified floor price. Thus, even though the overall price quotation may satisfy all pricing rules applicable at the level of a price quotation (e.g., a total price requirement and/or a total margin requirement), the price quotation may still be rejected for violations of pricing rules applicable at the line item level.

A need therefore exists for resolving line item anomalies in such a data record having multiple line items.

SUMMARY

In one embodiment, a method comprises obtaining a data record comprising a plurality of line items; assigning each of the line items in the data record to a given cluster of similar line items to determine a line item neighborhood score for each line item based on a comparison of a given line item to other available line items in the assigned cluster; applying a plurality of features of the data record to a machine learning model to determine a data record score for the data record based on a combination of the line item neighborhood scores for each line item in the data record; identifying one or more anomalies in the data record based on one or more of the data record score and the line item neighborhood score for each line item in the data record; and adjusting one or more parameters of one or more of the plurality of line items to address the one or more anomalies identified in the data record to produce a reconciled data record, based on one or more of the line item neighborhood scores and one or more predefined adjustment rules.

In some embodiments, the data record score for the data record indicates a likelihood that the data record will be approved and compares a quality of the data record in comparison to a plurality of similar historical data records, based on one or more predefined similarity criteria. In addition, the line item neighborhood score for each line item can be determined for a combination of geographic region and product.

Other illustrative embodiments include, without limitation, apparatus, systems, methods and computer program products comprising processor-readable storage media.

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for data record anomaly reconciliation using machine learning models.

As noted above, one or more anomalous line items may cause an entire data record to be rejected. For example, a price quotation having multiple line items may include one or more line items that violate one or more pricing rules, such as a particular line item being below a specified floor price (or a particular line item having a negative margin). Thus, even though the overall price quotation may satisfy all pricing rules applicable at the level of a price quotation (e.g., a total price requirement and/or a total margin requirement), the price quotation may still be rejected for violations of pricing rules applicable at the line item level. A special pricing team may be required to review such an anomalous price quotation, which can be a manual and labor-intensive process causing significant delays in the approvals of deals.

In one or more embodiments, a data-driven data record anomaly reconciliation solution is provided that scores a data record having multiple line items using machine learning and statistical approaches. In some embodiments, a user can be provided with one or more factors that contribute to the data record and/or a line item being classified as anomalous.

In some embodiments, the line items in a data record comprising a plurality of line items are assigned a line item neighborhood score using clusters of similar line items and a comparison of a given line item to other available line items in the assigned cluster. In addition, features of the data record are applied to a machine learning model to determine a data record score based on a combination of the line item neighborhood scores for the line items in the data record. Thereafter, anomalies in the data record can be identified based on the data record score and/or the line item neighborhood score for each line item in the data record.

In at least one embodiment, parameters of one or more of the line items can be adjusted to address the anomalies identified in the data record to produce a reconciled data record, based on the line item neighborhood scores and/or one or more predefined adjustment rules.

Figure 1:
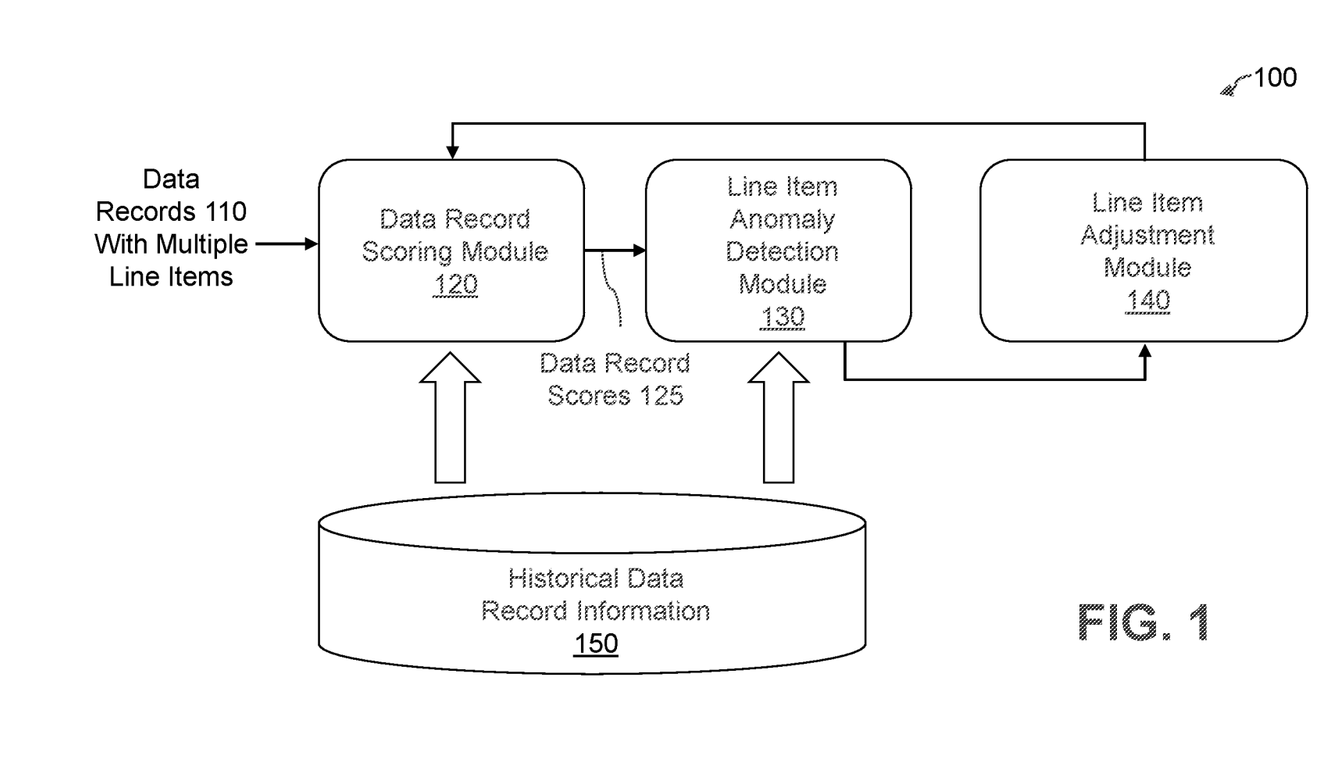
FIGS. 1 and 2 illustrate an exemplary data record anomaly reconciliation system that identifies and optionally resolves anomalies in one or more line items of a data record, according to an embodiment of the disclosure.

FIG. 1 illustrates an exemplary data record anomaly reconciliation system 100 that identifies and optionally resolves anomalies in one or more line items of a data record, according to an embodiment of the disclosure. As shown in FIG. 1, one or more data records 110 having multiple line items are applied to a data record scoring module 120, which determines a data record score 125 for each data record 110, using historical data record information 150. The data record scoring module 120 may be implemented, for example, using a machine learning model that is trained using the historical data record information 150.

In some embodiments, the data record score 125 for a given data record 110 indicates a likelihood that the given data record 110 will be approved (e.g., non-anomalous). For example, the data record score 125 for the given data record 110 compares a quality of the given data record 110 in comparison to a plurality of similar historical data records from the historical data record information 150, based on one or more predefined similarity criteria.

The data records 110 and associated data record scores 125 are applied to a line item anomaly detection module 130 that identifies one or more anomalies in a data record 110 based on the data record score 125 and line item neighborhood scores for each line item in the data record 110, as discussed further below. For example, in the case of an order quotation, the line item anomaly detection module 130 may detect that one or more line items of a data record 110 violate one or more pricing rules, such as a particular line item being below a specified floor price, or a particular line item having a negative margin.

Finally, a line item adjustment module 140 adjusts one or more parameters of one or more of the plurality of line items in a given data record 110 to address any anomalies identified in the data record 110 to produce a reconciled data record, based on one or more of the line item neighborhood scores and one or more predefined adjustment rules, discussed below.

Figure 2:
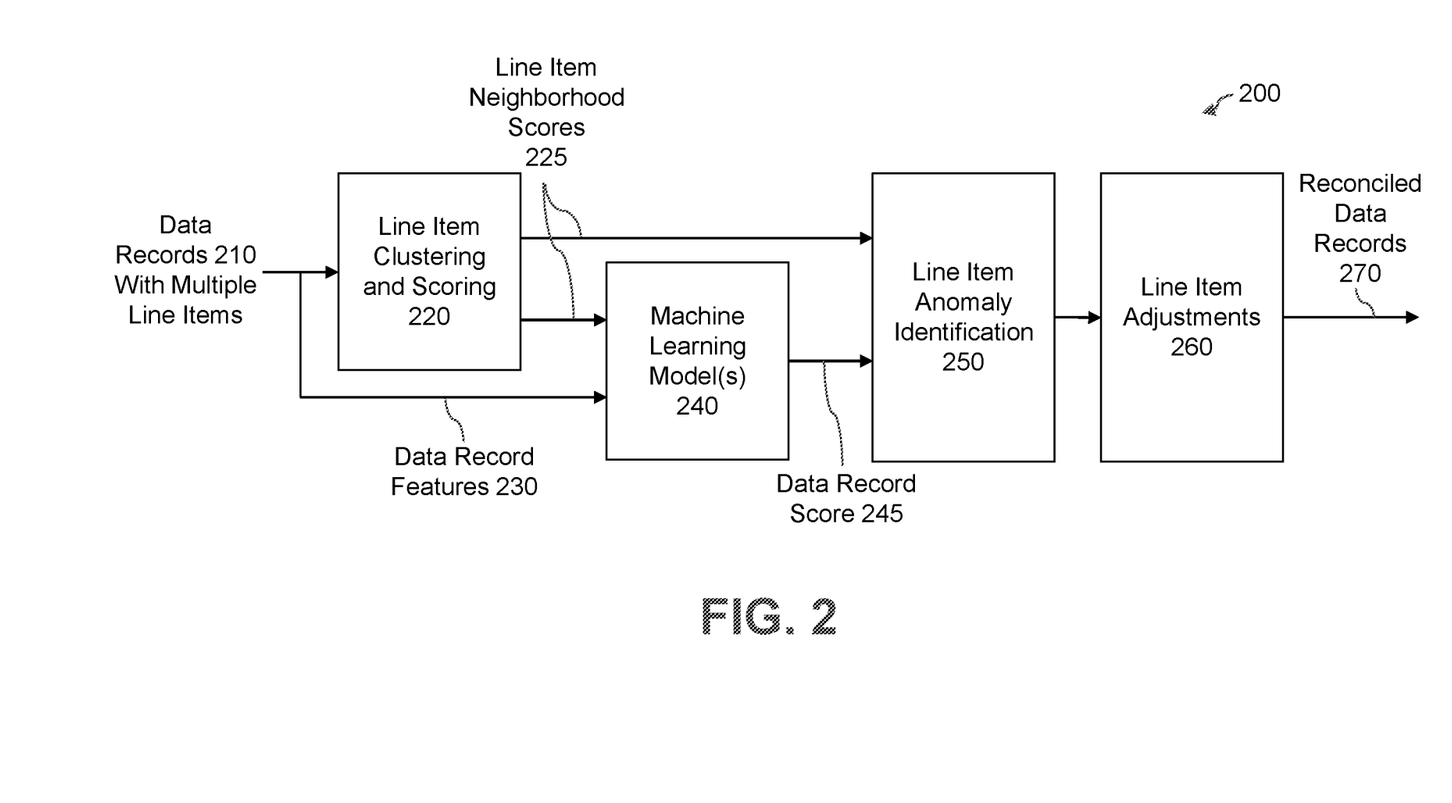

FIG. 2 illustrates an exemplary data record anomaly reconciliation system 200 that identifies and optionally resolves anomalies in one or more line items of a data record, according to at least one embodiment. As shown in FIG. 2, one or more data records 210 having multiple line items are applied to a line item clustering and scoring module 220 that generates corresponding line item neighborhood scores 225. The line item clustering and scoring module 220 assigns each of the line items in the data record 210 to a given cluster of similar line items (of a plurality of such clusters) to determine the line item neighborhood score 225 for each line item based on a comparison of a given line item to other available line items in the assigned cluster. The clustering is performed for segmentation based on the data. In some embodiments, the line item neighborhood score 225 for each line item is determined for a combination of geographic region and product.

In addition, a plurality of data record features 230 from the data record 210 are applied to one or more machine learning models 240 to determine a corresponding data record score 245. The corresponding data record scores 245 are obtained in some embodiments using a combination of the line item neighborhood scores 225 for each line item in the data record 210. The data record score 245 for the given data record 210 indicates a likelihood that the data record will be approved (e.g., non-anomalous). The data record score 245 for the given data record compares a quality of the data record 210 in comparison to a plurality of similar historical data records, based on one or more predefined similarity criteria. The machine learning models 240 may be implemented, for example, using a gradient boosting model to obtain the likelihood that the data record will be approved.

As shown in FIG. 2, a line item anomaly identification module 250 processes the line item neighborhood scores 225 and the data record scores 245 and identifies any anomalies in a given data record 210 based on the data record score 245 for given data record 210 and the line item neighborhood score for each line item in the given data record 210.

A line item adjustments module 260 adjusts one or more parameters of one or more of the plurality of line items in the given data record 210 to address one or more anomalies identified in the data record 210 to produce a reconciled data record 270, based on the line item neighborhood scores 225 and/or one or more predefined adjustment rules, as discussed further below. For example, when the data record is an order quotation, the predefined adjustment rules maintain, for example, a total price and a total margin of the order quotation. In some embodiments, the line items that have one or more parameters adjusted to resolve an identified data record anomaly are selected based on the respective line item neighborhood score 225.

In one or more embodiments, the exemplary data record anomaly reconciliation system 200 also provides a user with one or more predefined factors that contribute to the data record score 245 and/or the line item neighborhood scores 225 for the line items.

Figure 3:
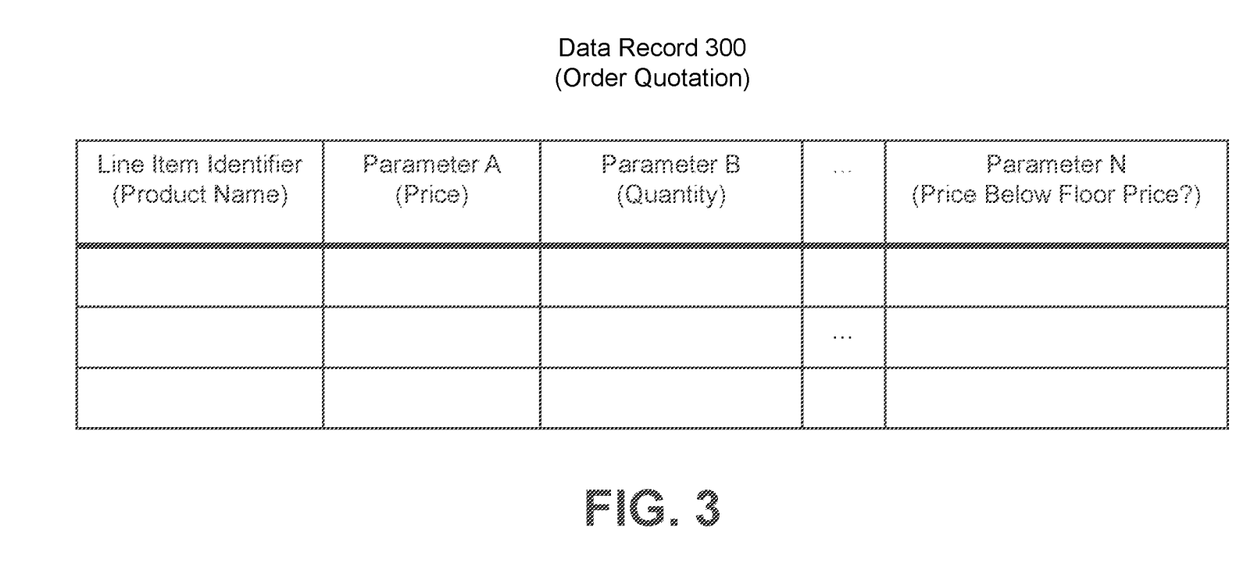
FIG. 3 illustrates an exemplary data record having multiple line items, according to some embodiments of the disclosure.

FIG. 3 illustrates an exemplary data record 300 having multiple line items, according to some embodiments of the disclosure. In the example of FIG. 3, the exemplary data record 300 corresponds to an order quotation. As shown in FIG. 3, a line item identifier is provided for each line item, as well as a number of parameters A through N, for each line item.

For the exemplary price quotation data record 300, the line item identifier is a product name for each product in the quotation and the parameters A through N, for each line item, include, for example, a price and quantity of each line item.

Figure 4:
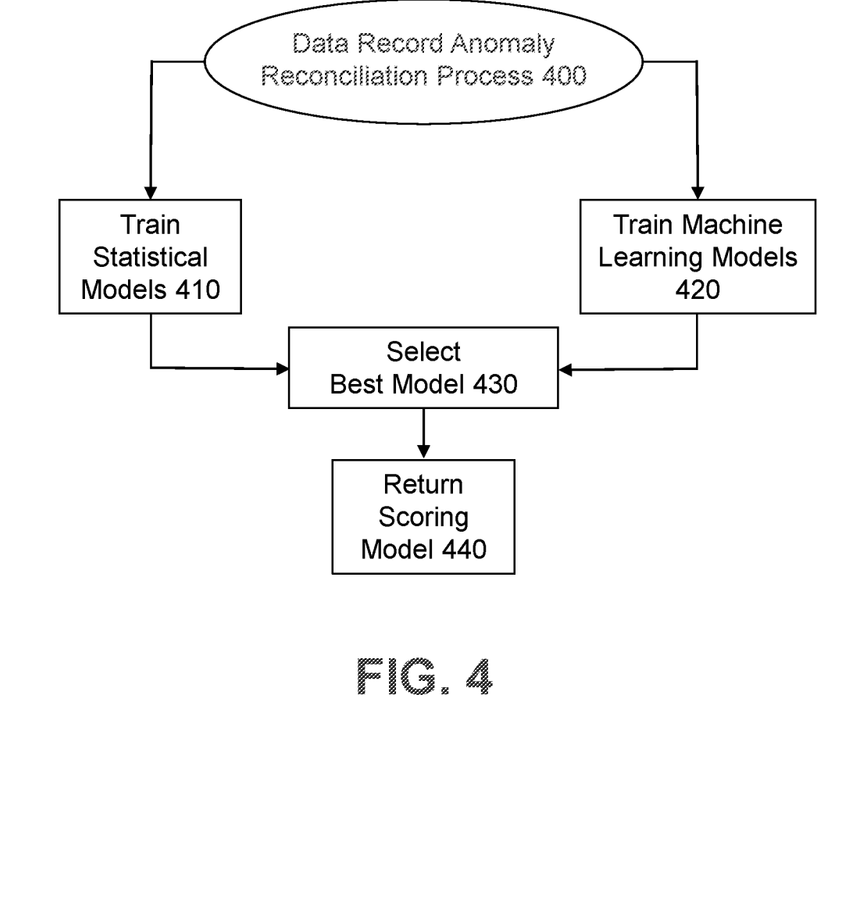
FIG. 4 is a flow chart illustrating an exemplary implementation of a data record anomaly reconciliation process, according to one embodiment of the disclosure.

FIG. 4 is a flow chart illustrating an exemplary implementation of a data record anomaly reconciliation process 400, according to one embodiment of the disclosure. In some embodiments, the data record anomaly reconciliation process 400 processes, for example, thresholds, machine learning models, and evaluation metrics as input parameters.

As shown in FIG. 4, the exemplary data record anomaly reconciliation process 400 trains one or more statistical models during step 410 and trains one or more machine learning models during step 420. The data record anomaly reconciliation process 400 selects the best model during step 430, for example, by Evaluating a performance of each model. In some embodiments, the selection of a "best" model involves one or more predefined selection criteria. Finally, the exemplary data record anomaly reconciliation process 400 returns a scoring model during step 440 used to determine one of more of the line item neighborhood scores 225 and the data record scores 245. In some embodiments, multiple models are trained using different machine learning algorithms with different parameters and by trying different features towards selecting the model that best separates between denied and approved deals.

Figure 5:
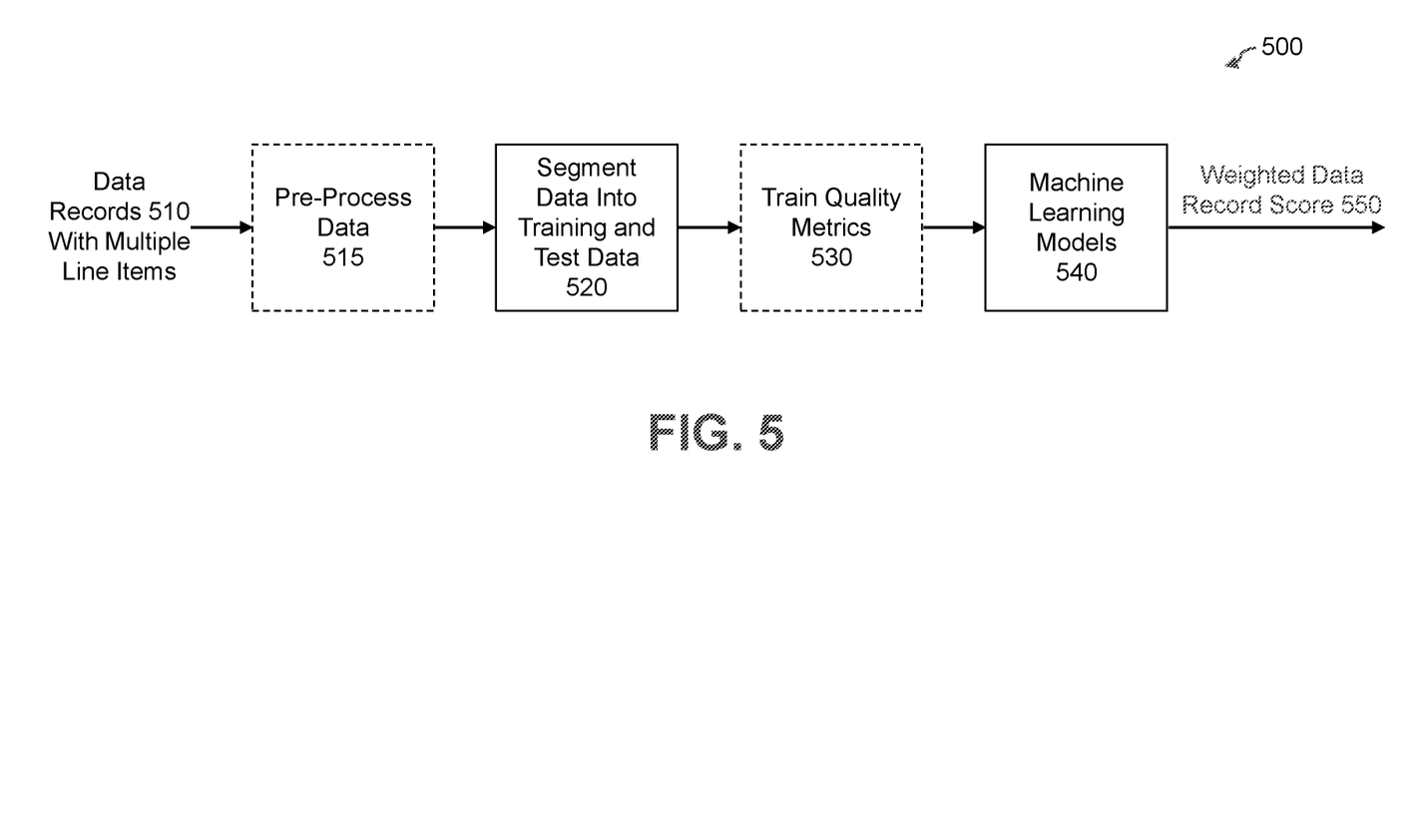
FIG. 5 illustrates an exemplary implementation of the data record scoring module of FIG. 1, according to one or more embodiments.

FIG. 5 illustrates an exemplary implementation 500 of the data record scoring module 120 of FIG. 1, according to one or more embodiments. As shown in FIG. 5, the exemplary data record scoring module implementation 500 comprises a loading and optional pre-processing of data records 510 having multiple line items during step 515. For example, the pre-processing of the data records 510 may comprise reading the data record into a data frame and cleansing and calculating columns. In addition, the data records 510 are divided or segmented by module 520 into training data and test data.

A number of quality metrics are optionally trained during stage 530. In some embodiments, multiple quality metrics from multiple categories are employed, such as:

comparative metrics indicating which percentile a particular case falls into, such as a margin percentage metric;

bias metrics indicating if there is bias in an input or process, such as an account attainment metric;

reporting metrics that are straight calculations, such as year-over-year revenue (or margin) metrics; and informative metrics used in rule-based decision making, such as an expired promotion metric.

Some exemplary quality metrics employed in some implementations include, for example: line item margin percentage score providing a score of per unit (line item) margin percent based on neighborhoods of items;

distance from floor score indicating a difference between an actual discount percent and a floor discount percent;

account attainment score proving a ratio of ordered revenue from committed revenue, per customer; and year-over-year revenue growth (and/or margin growth).

The machine learning models 540 can be trained to predict whether a given data record will be approved or denied (e.g., non-anomalous or anomalous) based on the previously calculated quality metrics. In this manner, the employed quality metrics can be used by the machine learning models 540 to determine a weighted data record score 550, as follows:

$$\text{Weighted Data Record Score} = \Sigma_{n=1}^{x}(\text{Metric}_n \times \text{Weight}_n)$$

which can be derived using historical data applied to the employed quality metrics.

Figure 6:
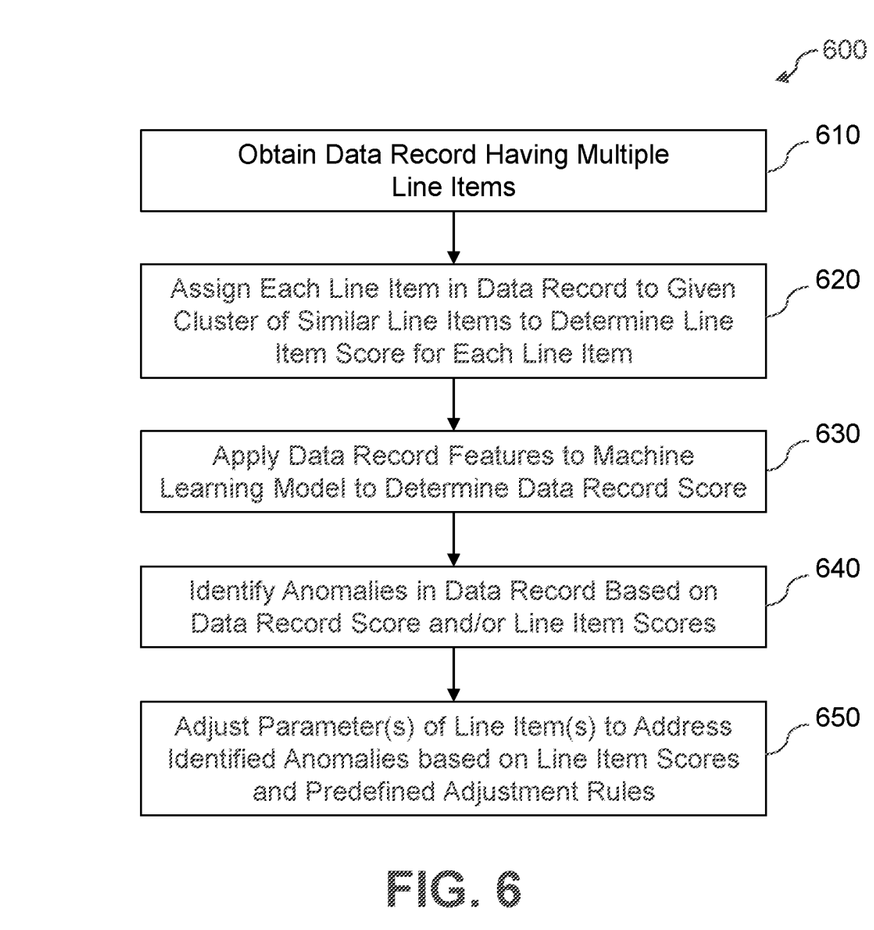
FIG. 6 is a flow chart illustrating an exemplary implementation of an alternate data record anomaly reconciliation process, according to at least one embodiment.

FIG. 6 is a flow chart illustrating an exemplary implementation of an alternate data record anomaly reconciliation process 600, according to at least one embodiment. As shown in FIG. 6, the exemplary data record anomaly reconciliation process 600 initially obtains a data record during step 610 comprising a plurality of line items.

Thereafter, the exemplary data record anomaly reconciliation process 600 assigns each of the line items in the data record to a given cluster of similar line items during step 620 to determine a line item neighborhood score for each line item based on a comparison of a given line item to other available line items in the assigned cluster, A plurality of features of the data record are applied during step 630 to a machine learning model to determine a data record score for the data record based on a combination of the line item neighborhood scores for each line item in the data record.

During step 640, the data record anomaly reconciliation process 600 identifies one or more anomalies in the data record based on one or more of the data record score and the line item neighborhood score for each line item in the data record. Finally, one or more parameters of one or more of the plurality of line items are adjusted during step 650 to address the one or more anomalies identified in the data record to produce a reconciled data record, based on one or more of the line item neighborhood scores and one or more predefined adjustment rules. For example, the predefined adjustment rules may maintain the total price and total margin from an original order quotation, while changing a price (or another parameter) of line items to avoid a detected anomaly, for example, using historical information of anomalous and non-anomalous line items.

Among other benefits, the disclosed techniques for resolving line item anomalies in a data record having multiple line items are one or more of:

integrative by leveraging multiple data sources and multiple aspects of a data record; flexible and modular by allowing new ideas and hypothesis to be integrated and tested; assessable by relying on objective evaluation criteria; and intelligible, as the final data record score and its reason can be communicated to the user.

In one or more embodiments, techniques are provided for data record anomaly reconciliation using machine learning models. The line items in a data record comprising a plurality of line items are assigned a line item neighborhood score using clusters of similar line items and a comparison of a given line item to other available line items in the assigned cluster. In addition, features of the data record are applied to a machine learning model to determine a data record score based on a combination of the line item neighborhood scores for the line items in the data record. Thereafter, anomalies in the data record can be identified based on the data record score and/or the line item neighborhood score for each line item in the data record. In at least one embodiment, parameters of one or more of the line items can be adjusted to address the anomalies identified in the data record to produce a reconciled data record, based on the line item neighborhood scores and/or one or more predefined adjustment rules.

One or more embodiments of the disclosure provide improved methods, apparatus and computer program products for data record anomaly reconciliation using machine learning models. The foregoing applications and associated embodiments should be considered as illustrative only, and numerous other embodiments can be configured using the techniques disclosed herein, in a wide variety of different applications.

It should also be understood that the disclosed data record anomaly reconciliation techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for data record anomaly reconciliation using machine learning models may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform-as-a-Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based data record anomaly reconciliation engine, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a cloud-based data record anomaly reconciliation platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 7 and 8. These platforms may also be used to implement at least portions of other information processing systems in other embodiments.

Figure 7:
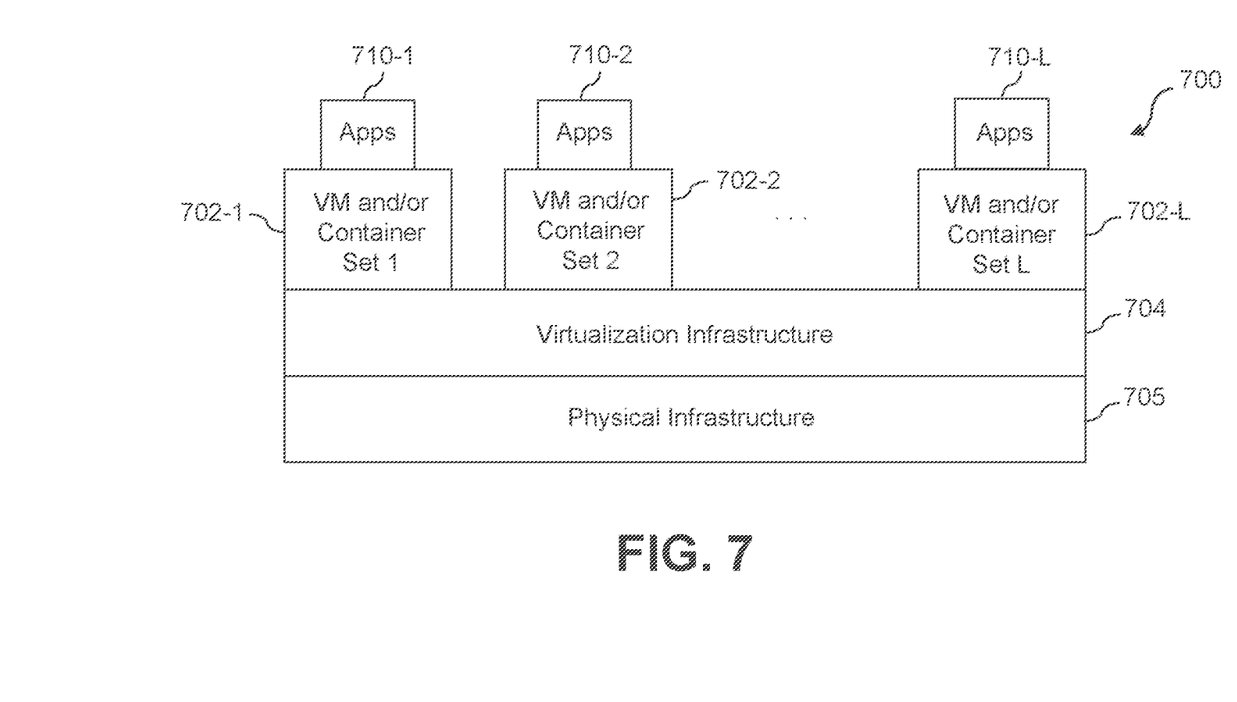
FIG. 7 illustrates an exemplary processing platform that may be used to implement at least a portion of one or more embodiments of the disclosure comprising a cloud infrastructure.

FIG. 7 shows an example processing platform comprising cloud infrastructure 700. The cloud infrastructure 700 comprises a combination of physical and virtual processing resources that may be utilized to implement at least a portion of the data record anomaly reconciliation system 100. The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 may comprise respective VMs, respective sets of one or more containers, or respective sets of one or more containers running in VMs.

In some implementations of the FIG. 7 embodiment, the VMs/container sets 702 comprise respective VMs implemented using virtualization infrastructure 704 that comprises at least one hypervisor. Such implementations can provide data record anomaly reconciliation functionality of the type described above for one or more processes running on a given one of the VMs. For example, each of the VMs can implement data record anomaly reconciliation control logic and associated line item adjustments for providing data record anomaly reconciliation functionality for one or more processes running on that particular VM.

A hypervisor platform that may be used to implement a hypervisor within the virtualization infrastructure 704, where the hypervisor platform has an associated virtual infrastructure management system. The underlying physical machines may comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system. Such implementations can provide data record anomaly reconciliation functionality of the type described above for one or more processes running on different ones of the containers. For example, a container host device supporting multiple containers of one or more container sets can implement one or more instances of data record anomaly reconciliation control logic and associated line item adjustments for providing data record anomaly reconciliation functionality.

As is apparent from the above, one or more of the processing modules or other components of system 100 may each run on a computer, server, storage device or other processing platform element. A given such element may be viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises at least a portion of the given system and includes a plurality of processing devices, denoted 802-1, 802-2, 802-3, . . . 802-K, which communicate with one another over a network 804. The network 804 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 802-1 in the processing platform 800 comprises a processor 810 coupled to a memory 812. The processor 810 may comprise a microprocessor, a microcontroller, an application specific integrated circuit (ASIC), a field programmable gate array (FPGA) or other type of processing circuitry, as well as portions or combinations of such circuitry elements, and the memory 812, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and the given system may include additional or alternative processing platforms, as well as numerous distinct processing platforms in any combination, with each such platform comprising one or more computers, storage devices or other processing devices.

Figure 8:
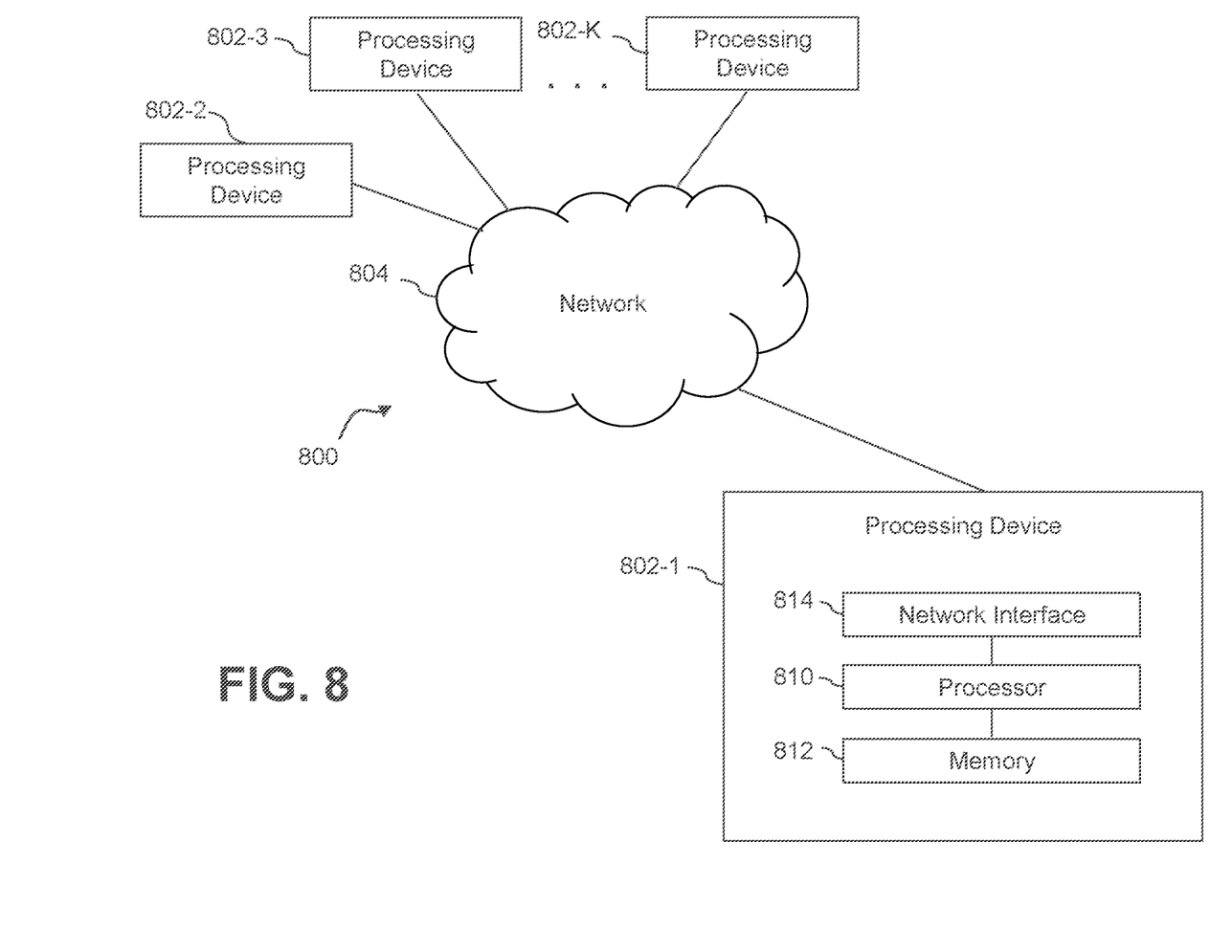
FIG. 8 illustrates another exemplary processing platform that may be used to implement at least a portion of one or more embodiments of the disclosure.

Multiple elements of an information processing system may be collectively implemented on a common processing platform of the type shown in FIG. 7 or 8, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
    obtaining a data record comprising a plurality of line items;
    assigning each of the line items in the data record to a given cluster, of a plurality of clusters, of similar line items to determine a line item neighborhood score for each line item based on a comparison of a given line item to other available line items in the assigned cluster;
    applying a plurality of features of the data record to a machine learning model to determine a data record score for the data record based on a combination of the line item neighborhood scores for each line item in the data record, wherein the data record score indicates a likelihood that the data record will be anomalous;
    identifying one or more anomalies in the data record based on one or more of the data record score and the line item neighborhood score for each line item in the data record; and
    adjusting one or more parameters of one or more of the plurality of line items of the data record to address the one or more anomalies identified in the data record to produce a reconciled data record, based on one or more of the line item neighborhood scores and one or more predefined adjustment rules;
    wherein the method is performed by at least one processing device comprising a processor coupled to a memory.

2. The method of claim 1, wherein the step of applying the plurality of features of the data record to the machine learning model further comprises using a plurality of trained quality metrics to determine the data record score.

3. The method of claim 1, wherein the data record score for the data record indicates a likelihood that the data record will be approved.

4. The method of claim 1, wherein the data record score for the data record compares a quality of the data record in comparison to a plurality of similar historical data records, based on one or more predefined similarity criteria.

5. The method of claim 1, wherein the line item neighborhood score for each line item is determined for a combination of geographic region and product.

6. The method of claim 1, further comprising providing a user with one or more predefined factors that contribute to the one or more of the data record score and the line item neighborhood score for each line item.

7. The method of claim 1, wherein the data record is an order quotation and wherein the one or more predefined adjustment rules maintain one or more of a total price and a total margin of the order quotation.

8. The method of claim 7, wherein the one or more line items having one or more parameters that are adjusted are selected based on the respective line item neighborhood score.

9. A computer program product, comprising a tangible machine-readable storage medium having encoded therein executable code of one or more software programs, wherein the one or more software programs when executed by at least one processing device perform the following steps:
    obtaining a data record comprising a plurality of line items;

assigning each of the line items in the data record to a given cluster, of a plurality of clusters, of similar line items to determine a line item neighborhood score for each line item based on a comparison of a given line item to other available line items in the assigned cluster;

applying a plurality of features of the data record to a machine learning model to determine a data record score for the data record based on a combination of the line item neighborhood scores for each line item in the data record, wherein the data record score indicates a likelihood that the data record will be anomalous;

identifying one or more anomalies in the data record based on one or more of the data record score and the line item neighborhood score for each line item in the data record; and adjusting one or more parameters of one or more of the plurality of line items of the data record to address the one or more anomalies identified in the data record to produce a reconciled data record, based on one or more of the line item neighborhood scores and one or more predefined adjustment rules.

10. The computer program product of claim 9, wherein the step of applying the plurality of features of the data record to the machine learning model further comprises using a plurality of trained quality metrics to determine the data record score.

11. The computer program product of claim 9, wherein the data record score for the data record indicates a likelihood that the data record will be approved.

12. The computer program product of claim 9, wherein the data record score for the data record compares a quality of the data record in comparison to a plurality of similar historical data records, based on one or more predefined similarity criteria.

13. The computer program product of claim 9, further comprising providing a user with one or more predefined factors that contribute to the one or more of the data record score and the line item neighborhood score for each line item.

14. The computer program product of claim 9, wherein the data record is an order quotation and wherein the one or more predefined adjustment rules maintain one or more of a total price and a total margin of the order quotation, and wherein the one or more line items having one or more parameters that are adjusted are selected based on the respective line item neighborhood score.

15. An apparatus, comprising:
a memory; and
at least one processing device, coupled to the memory, operative to implement the following steps:

obtaining a data record comprising a plurality of line items;

assigning each of the line items in the data record to a given cluster, of a plurality of clusters, of similar line items to determine a line item neighborhood score for each line item based on a comparison of a given line item to other available line items in the assigned cluster;

applying a plurality of features of the data record to a machine learning model to determine a data record score for the data record based on a combination of the line item neighborhood scores for each line item in the data record, wherein the data record score indicates a likelihood that the data record will be anomalous;

identifying one or more anomalies in the data record based on one or more of the data record score and the line item neighborhood score for each line item in the data record; and adjusting one or more parameters of one or more of the plurality of line items of the data record to address the one or more anomalies identified in the data record to produce a reconciled data record, based on one or more of the line item neighborhood scores and one or more predefined adjustment rules.

16. The apparatus of claim 15, wherein the step of applying the plurality of features of the data record to the machine learning model further comprises using a plurality of trained quality metrics to determine the data record score.

17. The apparatus of claim 15, wherein the data record score for the data record indicates a likelihood that the data record will be approved.

18. The apparatus of claim 15, wherein the data record score for the data record compares a quality of the data record in comparison to a plurality of similar historical data records, based on one or more predefined similarity criteria.

19. The apparatus of claim 15, further comprising providing a user with one or more predefined factors that contribute to the one or more of the data record score and the line item neighborhood score for each line item.

20. The apparatus of claim 15, wherein the data record is an order quotation and wherein the one or more predefined adjustment rules maintain one or more of a total price and a total margin of the order quotation, and wherein the one or more line items having one or more parameters that are adjusted are selected based on the respective line item neighborhood score.

\* \* \* \* \*